US006925554B1

(12) United States Patent
Wright et al.

(10) Patent No.: US 6,925,554 B1
(45) Date of Patent: Aug. 2, 2005

(54) METHOD OF PROGRAMMING USB MICROCONTROLLERS

(75) Inventors: David G. Wright, Woodinville, WA (US); Timothy J. Williams, Bellevue, WA (US); Jeffrey D. Wick, Snohomish, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 610 days.

(21) Appl. No.: 09/973,260

(22) Filed: Oct. 9, 2001

(51) Int. Cl.[7] .............................................. G06F 15/78
(52) U.S. Cl. ......................... 712/248; 712/32; 712/37; 712/39; 712/227; 712/229
(58) Field of Search .......................... 702/32, 229, 119, 702/120; 712/32, 37, 39, 227, 229, 248

(56) References Cited

U.S. PATENT DOCUMENTS

| 5,452,339 | A | * | 9/1995 | Siu et al. ................. 379/27.01 |
| 5,467,286 | A | * | 11/1995 | Pyle et al. ..................... 702/62 |
| 5,590,273 | A | * | 12/1996 | Balbinot ........................ 714/3 |
| 6,009,496 | A | * | 12/1999 | Tsai ............................ 711/103 |
| 2002/0196029 | A1 | * | 12/2002 | Schmidt ..................... 324/500 |

FOREIGN PATENT DOCUMENTS

WO    WO 98/19234    * 5/1998

* cited by examiner

Primary Examiner—William M. Treat
(74) Attorney, Agent, or Firm—Christopher P. Maiorana, PC

(57) ABSTRACT

An apparatus comprising a microcontroller configured to (i) send or receive data over one or more data lines when in a first mode and (ii) be programmed through said data lines when in a second mode.

20 Claims, 2 Drawing Sheets

METHOD OF PROGRAMMING USB MICROCONTROLLERS

FIELD OF THE INVENTION

The present invention relates to a method and/or architecture for implementing computer peripherals generally and, more particularly, to a method and/or architecture for implementing a device programming configuration for USB microcontrollers.

BACKGROUND OF THE INVENTION

Typically, one-time programmable (OTP) and other reprogrammable devices are used for development or prototyping and only used production in lower volume and higher value products. OTP devices can be uniquely programmed with general information, such as serial numbers. However, programming OTP devices with manufacturing data or individual product specific data is not feasible using conventional approaches. In high volume manufacturing, OTP devices are programmed by the vendor, therefore adding product specific data (i.e., data that depends on the final device configuration or characteristics) is generally not feasible.

Typically, microcontrollers in mass production low-cost consumer and computer products are "mask programmed" (i.e., the microcontroller firmware is hard-wired within the microcontroller). Mask programmed devices have the same disadvantages as OTP devices. In particular, mask programmed devices implement hard coded firmware. Since firmware is typically implemented as metal or diffusion layers of the IC, firmware "bug fixes" require a change to the IC. Design of masked programmed devices has a long time to market (i.e., first samples typically have a 6–8 week lead time because of the need for the IC vendor to first fabricate new partial mask sets, and then fabricate the devices). Design of masked programmed devices also have long lead times (i.e., the IC vendor needs to custom manufacture specific ICs for each customer design). Furthermore, masked devices do not allow customization of each masked programmed IC with, for example, a serial number or configuration data.

Dedicated in-system reprogrammability (ISR) pins add to a total pin-count (ISR™ is a trademark of Cypress Semiconductor Corporation, San Jose, Calif., referring to an in-system reprogrammable complex programmable logic device). Since USB microcontrollers have a limited number of pins (e.g., 16 or less), dedicated ISR pins add to package size and cost. Additionally, ISR is not possible once the circuit board has been placed in the final enclosure unless a special programming connection is exposed to the customer.

It would be desirable to provide a method and/or architecture for implementing computer peripherals that allows reprogrammability without dedicating pins to such reprogrammability.

SUMMARY OF THE INVENTION

The present invention concerns an apparatus comprising a microcontroller configured to (i) send or receive data over one or more data lines when in a first mode and (ii) be programmed through said data lines when in a second mode.

The objects, features and advantages of the present invention include providing a method and/or architecture for implementing a device programming configuration for microcontrollers that may (i) be programmed with dedicated test (or calibration) programs during manufacturing that may be over-written at final testing, (ii) provide calibration, (iii) allow inventory reduction, (iv) provide upgradeability, (v) allow unique configuration data to be stored in each device, (vi) allow unique test data to be stored in each device and/or (vii) allow firmware changes after the device has been programmed and assembled.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
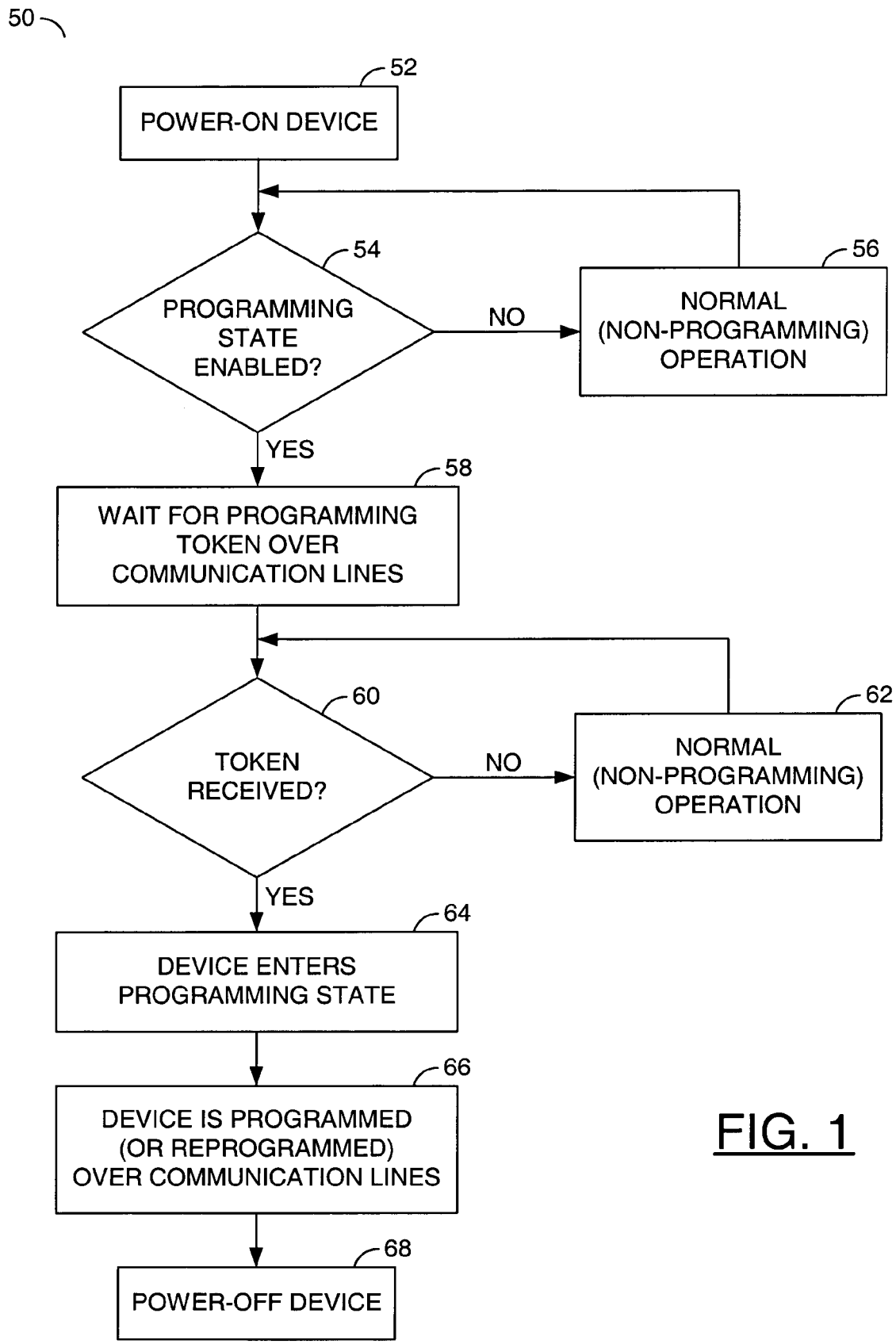
FIG. 1 is a flow chart of a preferred embodiment of the present invention.

Referring to FIG. 1, a flow chart of a method (or process) 50 is shown in accordance with a preferred embodiment of the present invention. The process 50 may provide a unique device programming configuration for PC peripherals. The process 50 may provide an improved method of programming USB microcontrollers.

The process 50 generally comprises a state 52, a decision state 54, a state 56, a state 58, a decision state 60, a state 62, a state 64, a state 66 and a state 68. While in the state 52, the process 50 may power-on the device. While in the state 54, the process 50 may determine if the programming state is enabled. If the programming state is not enabled, the process 50 may continue to the state 56. While in the state 56, the process 50 may run under normal operating conditions (e.g., a non-programming state). The process 50 may periodically return to the decision state 54 from the state 56.

If the programming state is enabled, the process 50 may proceed to the state 58. While in the state 58, the process 50 may wait for programming token to be passed over the communication lines (e.g., D– and D+ of the circuit 100, for a USB device). The process 50 may then continue to the decision state 60. While in the decision state 60, the process 50 may determine if the programming token is received. If the programming token is not received, the process 50 may continue to the state 62. While in the state 62, the process 50 may continue to run under normal operating conditions (e.g., a non-programming state). The process 50 may periodically return to the decision state 60 from the state 62.

If the programming token is received, the process 50 may proceed to the state 64. While in the state 64, the process 50 may allow the device to enter the programming state. The process 50 may then proceed to the state 66. While in the state 66, the device may be programed (or reprogrammed) over the communication lines. The process 50 may then proceed to the state 68. While in the state 68, the process 50 may power-off the device.

The process 50 may be configured to ensure that the device is not accidently programmed (or reprogrammed). The decision state 54 may be optional. For example, a programming voltage (e.g. 5V, –5V, 12V, –12V, etc.) may be applied externally (to be discussed further in connection with FIGS. 2 and 3). Such a programming voltage may or may not be needed at power up. However, the present invention is not limited to an external programming voltage. The process 50 may implement another appropriate unlocking of the programming mode in order to meet the design criteria of a particular implementation.

Alternatively, the state 54 may also be configured to determine a state of the communication lines. For example, the state 54 may be configured to determine if the communication lines are in a non-default state. For example, the state 54 may be configured to determine a non-default 'K' state of a USB device. The programming token configuration of the states 58 and 60 may provide additional programming security. For example, the states 58 and 60 may prevent programming due to illegal USB packets.

Furthermore, a particular implementation the communication lines may vary depending on an implementation of the present invention. In one example, the communications lines may be a serial port for a PS2 implementation. In another example, the communications lines may be D− and D+ lines for a USB implementation.

Figure 2:
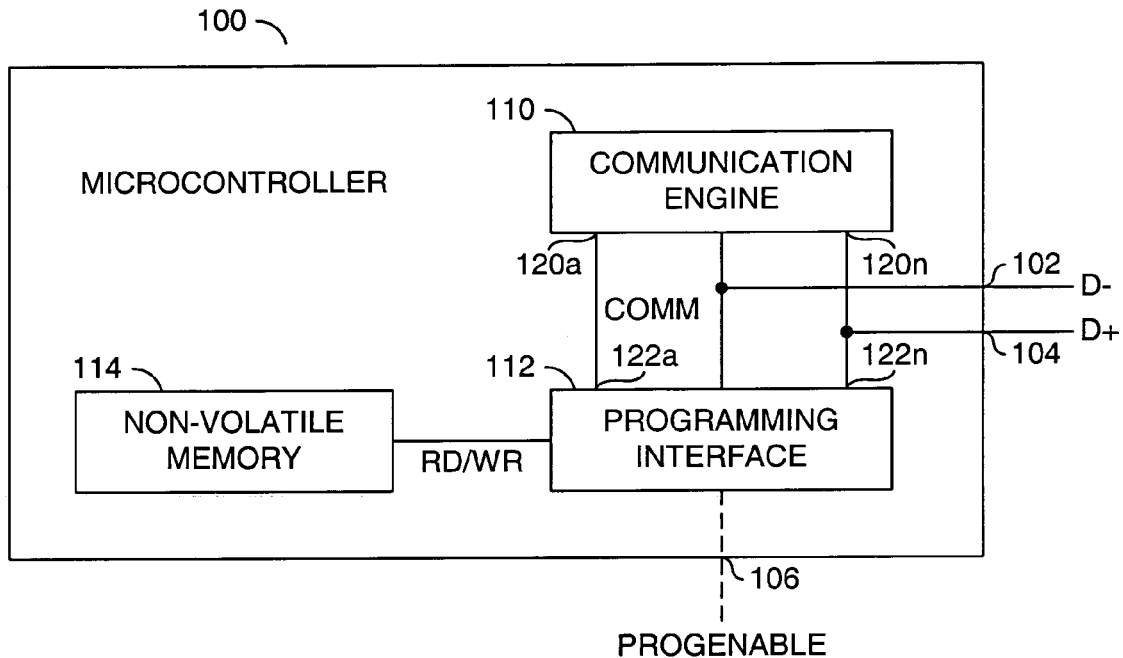
FIG. 2 is a block diagram illustrating an implementation of the present invention.

Referring to FIG. 2, a block (or circuit) 100 is shown illustrating an implementation of the present invention. The circuit 100 may be implemented as a microcontroller/microprocessor. The circuit 100 may be configured to implement the method 50. In one example, the microcontroller 100 may be implemented as a USB microcontroller. The USB microcontroller 100 may have an input/output 102 that may receive/present a signal (e.g., D−) and an input/output 104 that may receive/present a signal (e.g., D+). The signals D− and/or D+ may be referred to as voltage levels, nodes, or other appropriate nomenclature.

The circuit 100 may also have an input 106 that may receive a signal (e.g., PROGENABLE). The signal PROGENABLE may be optionally implemented. The signal PROGENABLE may be implemented as an external programming voltage. The circuit 100 generally comprises a communication engine 110, a programming interface 112 and a non-volatile memory 114. The communication engine 110 may have a number of input/outputs 120a–120n that may present/receive a signal (e.g., COMM), the signal D− and the signal D+. The programming interface 112 may also have a number of input/outputs 122a–122n that may present/receive the signals COMM, D− and D+. The signals D− and D+ may be presented to the outputs 102 and 104, respectively. The programming interface 106 may also interface the memory 114 via a signal (e.g., RD/WR). The signal RD/WR may be implemented as a multi-bit or single-bit signal. The programming interface 112 may also receive the signal PROGENABLE, when applicable.

The signal PROGENABLE may be optional. In one example, the signal PROGENABLE may be a logical enable signal. In another example, the signal PROGENABLE may be a predetermined programming voltage (e.g., 5V, −5V, 12V, −12V, etc.). The signal PROGENABLE may be used in conjunction with or in place of a requirement to have the data lines in the USB 'K' state at power-up. The signal PROGENABLE may increase robustness of the circuit 100. For example, the signal PROGENABLE may prevent accidental programming.

Figure 3:
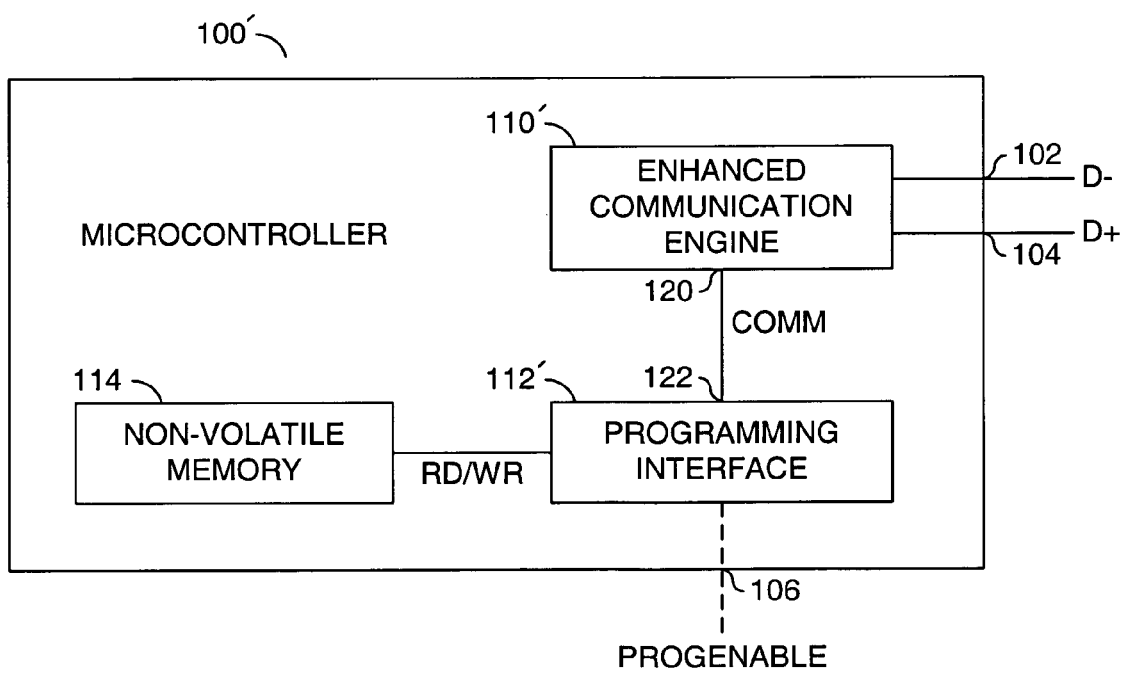
FIG. 3 is a block diagram illustrating an alternate implementation of the present invention.

Referring to FIG. 3, a circuit (or system) 100' is shown. The circuit 100' may be similar to the circuit 100. However, the communication engine 110' may be implemented as an enhanced communication engine. The enhanced communication engine 110' may be configured to solely present/receive the signals D− and D+. The enhanced communication engine 110' may then interface with the programming interface 112' via the signal COMM.

The method 50 may provide an in-system reprogrammable (ISR) device (e.g., the circuit 100). In one example, the method 50 may provide an ISR USB microcontroller (e.g., the circuit 100) that may be programmed over the data signals (or pins) D+ and D−. However, the method 50 may program the device 100 without using the USB protocol. Since overhead may be needed to decode the USB protocol in order to program the microcontroller 100, the D+ and D− pins may be directly implemented as simple serial shift register clock and data input pins. For example, the microcontroller 100 may clock a start address and data for a block of programmable memory to be programmed. However, the microcontroller 100 may implement other applicable programming specific signaling methods.

The method 50 may be configured to prevent unintended programming. The method 50 may need (i) the programming pins D− and D+ to be in a given state (e.g., a USB K state) when power is applied and (ii) the transmission of a simple code to unlock a programming mode of the circuit 100. Optionally, the program enable signal PROGENABLE may be at a predetermined logic level for the method 50 to unlock the circuit 100. Under normal operating conditions, the chance of the microcontroller 100 seeing the K-state at power on (unlikely because this is an illegal USB condition) being immediately followed by a specified short set of transitions (not legal in the USB protocol) is low.

The method 50 may allow the USB microcontroller to have non-volatile memory programmed or reprogrammed through the pins D+/D−. The circuit 100 may provide a USB peripheral device programmed over the pins D+/D− using a protocol other than the USB protocol to effect the programming. The circuit 100 may provide dual use of the pins D+/D− for both operating in a normal mode and operating in a special programming mode.

The USB microcontroller 100 may be configured to generate all voltages required to program on board programmable memory (not shown within the microcontroller 100). However, in certain technologies it may be necessary to apply another programming voltage (e.g., the signal PROGENABLE) to the device 100. For example, the signal PROGENABLE may be provided in the product enclosure, or externally through an opening in the enclosure, to supply the necessary programming voltage.

An exemplary application of the present invention may be implemented within a USB keyboard. Typical PC keyboard suppliers may manufacture a variety of different keyboards. Each keyboard may have a unique scan matrix such that mapping between the logical key in the keyboard matrix and the keyboard scan code (which is transmitted to the PC) are different for each keyboard. It is generally desirable for keyboard manufacturers to have a single, standard IC assembly that may be implemented for each type of keyboard. Present technologies do not provide such an application. Current keyboard microcontrollers may contain up to 8 scan matrix mapping tables, the selection of the matrix mapping table being determined by connecting 3 I/O pins on the microcontroller in a specific binary pattern. The process 50 may be configured to provide essentially identical ICs that may be assembled into all manufactured keyboards. The appropriate keyboard matrix mapping table may then be programmed into the microcontroller at final testing.

The circuit 100 may be applied to microcontrollers incorporating other serial protocols (e.g., PS2, etc.) or microcontrollers implementing wireless protocols (e.g., Bluetooth, etc.). The circuit 100 may be configured to provide a microcontroller featuring a PS2 interface having non-volatile memory programmed or reprogrammed through the PS2 interface pins. The method 50 may allow a PS2 peripheral device to be programmed over the PS2 interface using a protocol other than PS2 to effect the programming. The circuit 100 may provide dual use of the PS2 interface pins for both operating the PS2 protocol in a first (e.g. normal) mode and for operating some other protocol in a second (e.g. programming) mode.

The method 50 may allow calibration coefficients to be programmed into the device 100 during manufacturing or testing. The method 50 may program the circuit 100 with dedicated test and/or calibration programs during manufacturing. The programs may then be over-written at final testing. The method 50 may allow upgradeability of firmware within the enclosure during development and testing. The method 50 may also allow finished goods to be reworked (perhaps because of a bug or obsolescence) at a reduced cost, since firmware to fix the cause of the rework may be downloaded without opening the enclosure. The method 50 may reprogram the circuit 100 without opening the package.

The method 50 may allow inventory reduction, since the product manufacturer may only need to hold an inventory of a single unprogrammed device type, rather than multiple ready-programmed devices. The method 50 may allow less inventory to be held, reducing tied up funds. The method 50 may provide upgradeability (e.g., bugs may be fixed and features may be added without impact on the inventory). Additionally, the circuit 100 may also be applicable to IC manufacturers and distributors to achieve lower lead times by holding stock of unprogrammed devices.

The circuit 100 may also be applied to one-time programmable microcontrollers. Although the method 50 may provide the ability to reprogram a programmable memory, the method 50 may provide advantages over traditional programming methods for one-time programmable microcontrollers. The method 50 may also be applied to programming non-volatile data memory within a device. The method 50 may allow a device with program memory that has been factory programmed to have serial numbers and configuration data added at the final testing stage. The circuit 100 may allow programming to be achieved using the USB protocol (or similar applicable protocols). If the microcontroller 100 contains a smart serial interface engine configured to decode the USB protocol in logic, then such an implementation may be achieved at minimal additional cost.

The method 50 may prevent unintended programming by using illegal USB commands to facilitate programming. Such illegal USB commands may comprise using bad packet IDs, using bad cyclical redundancy checks, using bad data lengths, or using an illegal endpoint number (for low speed devices). However, other appropriate conventions may be implemented to prevent unintended programming. For example, if an external programming voltage is required, the presence of the programming voltage at power-up may be sufficient. The presence of a known state (e.g., a USB K-state) on the communication pins D− and D+ may be used in addition to or in place of the presence of the programming voltage at power up.

The method 50 may enable improvements during development and during manufacturing over conventional methods. The method 50 may allow writing of a microcontroller programmable memory at a final testing stage. The method 50 may also allow firmware to be readily upgraded to fix bugs or add features.

The function performed by the flow diagram of FIG. 1 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICS, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a communication engine configured to (i) transfer normal data over one or more data lines when in a first mode and (ii) receive programming data over said data lines when in a second mode; and
    a programming circuit configured to (i) receive said program data from said communication engine and (ii) write said program data to a memory.

2. The apparatus according to claim 1, wherein said memory is further configured to be programmed at a final test stage.

3. The apparatus according to claim 2, wherein said memory is further configured to be re-programmed after said final test stage.

4. The apparatus according to claim 2, wherein said memory is configured to be programmed with dedicated test or calibration programs which are over written at said final stage.

5. The apparatus according to claim 1, wherein said said data lines comprises a universal serial bus.

6. The apparatus according to claim 1, wherein said data lines are configured as (i) a serial shift register clock line and (ii) at least one input line for said program data.

7. The apparatus according to claim 1, wherein said memory is configured to be programmed with calibration coefficients during manufacturing or testing.

8. The apparatus according to claim 1, wherein said programming circuit comprises an input configured to receive an enable signal to alternatively enable and disable writing to said memory.

9. The apparatus according to claim 1, wherein said programming circuit is further configured to transfer read data from said memory to said communication engine.

10. An apparatus comprising:
    means for operating a microcontroller to (i) transfer normal data through one or more data lines when in a first mode, transfer said normal data through said data lines in a second mode in response to an assertion of an enable signal and (iii) enter a third mode in response to receiving a token through said data lines; and means for programming said microcontroller through said data lines when in said third mode.

11. A method for programming microcontrollers, comprising the steps of:
   (A) transferring normal data through one or more data lines when in a first mode;
   (B) transferring said normal data through said data lines when in a second mode in response to receiving an enable signal;
   (C) entering a third mode in response to receiving a token through said data lines; and
   (D) programming said microcontroller through said data lines when in said third mode.

12. The method according to claim 11, wherein step (B) further comprises:
   determining that a programming state is enabled.

13. The method according to claim 11, wherein said third mode comprises a programmable state.

14. The method according to claim 11, wherein said enable signal comprises a programming voltage.

15. The method according to claim 11, wherein said data lines comprise a Universal Serial Bus.

16. The method according to claim 11, wherein step (D) further comprises:
   re-programming said microcontroller.

17. The method according to claim 16, wherein step (D) further comprises:
   programming said microcontroller at a final test stage; and
   re-programming said microcontroller after said final test stage.

18. The method according to claim 11, wherein step (D) comprises:
   transferring programming data from said data lines through a first circuit to a second circuit.

19. The method according to claim 18, wherein step (D) further comprises:
   writing said programming data from said second circuit to a memory.

20. The method according to claim 11, wherein said enable signal is a K state of a Universal Serial Bus at power-up of said microcontroller.

* * * * *